US012772926B2

(12) United States Patent
Feldkamp et al.

(10) Patent No.: US 12,772,926 B2
(45) Date of Patent: Oct. 27, 2026

(54) ASSISTED STEERING SYSTEM FOR LAWN MAINTENANCE VEHICLE

(71) Applicant: Techtronic Cordless GP, Anderson, SC (US)

(72) Inventors: Jonathan R. Feldkamp, Anderson, SC (US); Grzegorz Kondro, Piedmont, SC (US); Robert T. Givens, Anderson, SC (US); Tanner Griffin, Overland Park, KS (US); Jeff Wilson, Olathe, KS (US); Patrick Sanchez, Kansas City, MO (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 101 days.

(21) Appl. No.: 19/007,867

(22) Filed: Jan. 2, 2025

(65) Prior Publication Data

US 2025/0214648 A1 Jul. 3, 2025

Related U.S. Application Data

(60) Provisional application No. 63/617,187, filed on Jan. 3, 2024.

(51) Int. Cl.
*A01D 34/00* (2006.01)
*A01D 34/82* (2006.01)
(Continued)

(52) U.S. Cl.
CPC ........... *A01D 34/008* (2013.01); *A01D 34/82* (2013.01); *B62D 11/003* (2013.01); *B62D 11/04* (2013.01)

(58) Field of Classification Search
None
See application file for complete search history.

(56) References Cited

U.S. PATENT DOCUMENTS 6,002,975 A 12/1999 Schiffmann et al.
6,422,333 B1 7/2002 Kjaer et al.
(Continued)

FOREIGN PATENT DOCUMENTS

AU 2025200023 A1 * 7/2025 ........... A01B 69/008
CN 107193208 A 9/2017
(Continued)

OTHER PUBLICATIONS

European Search Report Corresponding to Application No. 24223820 on May 6, 2025.

(Continued)

*Primary Examiner* — Kevin R Steckbauer
(74) *Attorney, Agent, or Firm* — Dority & Manning, P.A.

(57) ABSTRACT

A lawnmower including: a wheel; a motor operably coupled to drive the wheel; a user input configured to receive a steering control input from a user; and a controller configured to operate in a steering assist mode where the controller: receives information from the user input, the information including a position of the user input; compares the position of the user input to a gain profile saved in a memory of the controller; determines a scale factor from the gain profile based on the comparison; generates a command instruction to control a speed of the motor based on the position of the user input and the determined scale factor; and transmits the command instruction to the motor to affect a speed of the motor.

20 Claims, 3 Drawing Sheets

(51) Int. Cl.
*B62D 11/00* (2006.01)
*B62D 11/04* (2006.01)

(56) References Cited

U.S. PATENT DOCUMENTS

| | | | | |
|---|---|---|---|---|
| 6,456,194 | B1 | 9/2002 | Carlson et al. | |
| 6,983,583 | B2 | 1/2006 | Bucher | |
| 7,311,364 | B2 | 12/2007 | Robertson | |
| 7,549,243 | B1 | 6/2009 | Gilles | |
| 8,165,759 | B2 | 4/2012 | Boylston et al. | |
| 8,234,041 | B2 | 7/2012 | Fujii et al. | |
| 8,275,516 | B2 | 9/2012 | Murphy | |
| 8,352,116 | B2 | 1/2013 | Boylston et al. | |
| 8,548,722 | B2 | 10/2013 | Blow et al. | |
| 8,620,527 | B2 * | 12/2013 | Stone | B62D 11/24 180/311 |
| 8,712,639 | B2 | 4/2014 | Lu et al. | |
| 8,740,229 | B2 | 6/2014 | Ellsworth | |
| 9,459,097 | B2 | 10/2016 | Bavey et al. | |
| 10,001,361 | B2 | 6/2018 | Yamashita | |
| 10,730,510 | B2 | 8/2020 | Ross et al. | |
| 10,761,543 | B2 | 9/2020 | Schaff et al. | |
| 10,836,426 | B1 * | 11/2020 | Busboom | B62D 11/04 |
| 10,899,342 | B1 | 1/2021 | Brown et al. | |
| 11,378,984 | B2 | 7/2022 | Imamura et al. | |
| 11,383,727 | B2 | 7/2022 | Niesen et al. | |
| 11,395,458 | B1 | 7/2022 | Brown et al. | |
| 11,427,203 | B1 | 8/2022 | Brown et al. | |
| 12,134,319 | B1 * | 11/2024 | Bonny | B60L 7/18 |
| 12,472,839 | B2 * | 11/2025 | Holeton | A01D 34/006 |
| 12,477,975 | B2 * | 11/2025 | Bejcek | A01D 34/64 |
| 12,530,028 | B2 * | 1/2026 | Lyzen | A01B 1/00 |
| 2002/0128795 | A1 | 9/2002 | Schiffmann | |
| 2003/0236606 | A1 | 12/2003 | Lu et al. | |
| 2005/0113983 | A1 | 5/2005 | Schubert | |
| 2006/0155440 | A1 | 7/2006 | Gleacher | |
| 2006/0276939 | A1 | 12/2006 | Amen | |
| 2008/0243334 | A1 | 10/2008 | Bujak et al. | |
| 2009/0265058 | A1 | 10/2009 | Hasegawa et al. | |
| 2013/0110351 | A1 * | 5/2013 | Stone | B62D 11/24 701/33.1 |
| 2019/0193783 | A1 * | 6/2019 | Uemura | B60L 1/003 |
| 2019/0291779 | A1 | 9/2019 | Zeiler et al. | |
| 2020/0014320 | A1 * | 1/2020 | Ito | B60L 50/51 |
| 2020/0282969 | A1 * | 9/2020 | Manji | B60K 7/0007 |
| 2020/0377096 | A1 | 12/2020 | Park | |
| 2021/0022293 | A1 | 1/2021 | Kaneko et al. | |
| 2021/0076561 | A1 | 3/2021 | Kiyoka et al. | |
| 2021/0378171 | A1 | 12/2021 | Barber et al. | |
| 2022/0124972 | A1 | 4/2022 | Dai et al. | |
| 2022/0167554 | A1 | 6/2022 | Kowalewski et al. | |
| 2022/0183920 | A1 | 6/2022 | Raja | |
| 2022/0348189 | A1 | 11/2022 | Fujii | |
| 2022/0400598 | A1 | 12/2022 | Tamatani et al. | |
| 2023/0122499 | A1 * | 4/2023 | Holeton | A01D 34/006 320/109 |
| 2023/0182612 | A1 * | 6/2023 | Ballantyne | A01D 34/006 320/109 |
| 2023/0225254 | A1 | 7/2023 | Flygare et al. | |
| 2023/0232745 | A1 | 7/2023 | Sato et al. | |
| 2023/0249745 | A1 | 8/2023 | Maggard et al. | |
| 2023/0329143 | A1 | 10/2023 | Siebert et al. | |
| 2024/0081175 | A1 * | 3/2024 | Bejcek | A01D 34/64 |
| 2025/0214648 | A1 * | 7/2025 | Feldkamp | B60L 15/2036 |

FOREIGN PATENT DOCUMENTS

| | | | | | |
|---|---|---|---|---|---|
| CN | 111252046 | A | | 6/2020 | |
| CN | 114932909 | A | | 8/2022 | |
| CN | 115315177 | A | * | 11/2022 | H02J 7/855 |
| CN | 115769735 | A | | 3/2023 | |
| CN | 116161046 | A | | 5/2023 | |
| CN | 120240127 | A | * | 7/2025 | A01B 69/008 |
| DE | 102006045303 | B3 | | 2/2008 | |
| EP | 2218630 | B1 | | 12/2016 | |
| EP | 3704931 | A1 | * | 9/2020 | A01D 34/64 |
| EP | 3704931 | B1 | * | 10/2021 | B62D 11/003 |
| EP | 3807116 | B1 | * | 3/2022 | A01D 34/64 |
| EP | 4105437 | A1 | | 12/2022 | |
| EP | 4144563 | A1 | | 3/2023 | |
| EP | 4581922 | A1 | * | 7/2025 | A01B 69/008 |
| JP | 2582982 | Y2 | | 10/1998 | |
| JP | 2017132406 | A | * | 8/2017 | |
| JP | 2006096098 | A | | 4/2026 | |
| WO | WO2009043082 | A1 | | 4/2009 | |
| WO | WO-2021071655 | A1 | * | 4/2021 | H02J 7/855 |
| WO | WO2022165638 | A1 | | 8/2022 | |
| WO | WO2023044767 | A1 | | 3/2023 | |
| WO | WO2023073882 | A1 | | 5/2023 | |

OTHER PUBLICATIONS

Sears Canada, Inc., “20 HP Electric Start 40" Mower 6 Speed Transaxle Lawn Tractor”, Sears Owner’s Manual, Craftsman, Model No. 944.601181, Toronto, 52 Pages, Retrieved from: https://www.bayservice.ca/IPL/SEARS%20IPLS/944.6XXXXX/601181.pdf.

* cited by examiner

ASSISTED STEERING SYSTEM FOR LAWN MAINTENANCE VEHICLE

CROSS-REFERENCE TO RELATED APPLICATIONS

The present application claims priority to U.S. Provisional Patent Application Ser. No. 63/617,187 filed on Jan. 3, 2024, the disclosure of which is incorporated by reference herein in its entirety.

FIELD

The present disclosure relates generally to steerable lawn maintenance vehicles, and more particularly to assisted steering systems for lawnmowers and other vehicles for use in lawn maintenance.

BACKGROUND

Lawn maintenance is frequently carried out by powered vehicles that ride over a surface and perform lawn maintenance to or above that surface. For example, lawnmowers can include push mowers, riding mowers, and autonomous mowers, all of which ride on an underlying ground surface and cut grass emanating from the ground surface. Lawnmowers can be retrofit with various accessories that allow for additional lawn maintenance operations. For instance, lawnmowers can be retrofit with leaf collection systems, leaf blowing systems, edgers, misting and dispersion systems for casting various substances over the lawn or nearby objects, etc.

Forces acting on the lawnmowers can create undesirable effects. For example, when traversing a slope, the lawnmower will often tend to turn downhill as a result of gravitational force acting on the lawnmower. Similarly, when traversing a bumpy ground surface, one or more wheels of the lawnmower can become bumped and turned by undulations in the ground surface. Both of these instances can cause the lawnmower to veer from a desired path, e.g., as input by a riding operator via one or more lap bars, joysticks, steering wheels or the like.

Accordingly, improved assisted steering systems are desired in the art. In particular, assisted steering systems which provide easy, efficient steering correction would be advantageous.

BRIEF DESCRIPTION

In accordance with the present disclosure various aspects and embodiments will be set forth in part in the following description.

In accordance with one embodiment, a lawnmower is provided. The lawnmower includes a wheel; a motor operably coupled to drive the wheel; a user input configured to receive a steering control input from a user; and a controller configured to operate in a steering assist mode where the controller: receives information from the user input, the information including a position of the user input; compares the position of the user input to a gain profile saved in a memory of the controller; determines a scale factor from the gain profile based on the comparison; generates a command instruction to control a speed of the motor based on the position of the user input and the determined scale factor; and transmits the command instruction to the motor to affect a speed of the motor, wherein the gain profile has a first scale factor associated with a first position of the user input and a second scale factor associated with a second position of the user input, and wherein the first scale factor is different than the second scale factor.

In accordance with another embodiment, a steering assist system for a lawnmower is provided. The steering assist system includes an inertial measurement unit (IMU); and a controller configured to operate in a steering assist mode where the controller: receives information from a user input, the information including a position of the user input; receives, from the IMU, a measured angular velocity of the lawnmower; calculates a deviation between the measured angular velocity and an expected angular velocity based on the position of the user input; compares the position of the user input to a gain profile saved in a memory of the controller; determines a scale factor from the gain profile based on the comparison; generates a command instruction to control a speed of a motor of the lawnmower based on the position of the user input, the determined scale factor, and the calculated deviation; and transmits the command instruction to the motor to affect a speed of the motor, wherein the gain profile has a first scale factor associated with a first position of the user input and a second scale factor associated with a second position of the user input, and wherein the first scale factor is different than the second scale factor.

In accordance with another embodiment, non-transitory computer-readable medium storing instructions which, when executed, cause performance of a method of adjusting a direction of travel of a lawnmower using a steering assist system is provided. The method includes determining, by a controller of the lawnmower, an expected angular velocity of the lawnmower based on a position of a user input, the user input configured to receive a turn input from a user; measuring, by an inertial measurement unit (IMU) of the lawnmower, an actual angular velocity of the lawnmower; calculating, by the controller, an deviation between the expected angular velocity and the actual angular velocity; comparing, by the controller, the position of the user input to a gain profile saved in a memory of the controller; determining, by the controller, a scale factor from the gain profile based on the comparison, wherein the gain profile has a first scale factor associated with a first position of the user input and a second scale factor associated with a second position of the user input, and wherein the first scale factor is different than the second scale factor; applying, by the controller, the determined scale factor to the calculated deviation; determining, by the controller, a command instruction based on the calculated deviation in view of the applied determined scale factor; and transmitting the command instruction to a motor of the lawnmower to affect a speed of the motor.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

The detailed description that follows makes reference to the appended figures, in which.

DETAILED DESCRIPTION

Figure 1:
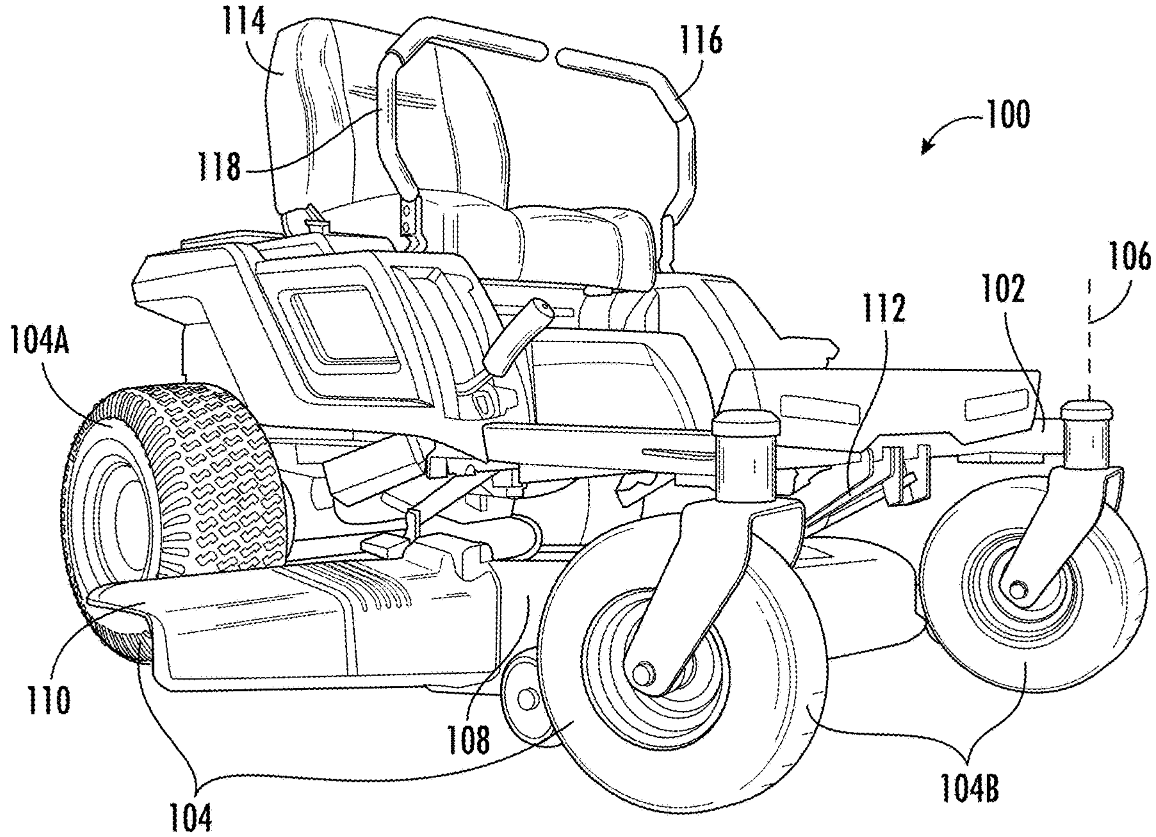
FIG. 1 is a perspective view of a lawnmower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising" "includes," "Including" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Lawnmowers and other lawn maintenance tools, such as tractors, powered wheelbarrows, skid steers, and the like can receive user inputs indicative of a desired direction of travel and convert the received user inputs into control signals that control motors to affect the desired direction of the travel. For example, a lawnmower can include left and right lap bars. As a user (e.g., a rider) adjusts the lap bars relative to one another, a control system of the lawnmower can adjust the control signals to the motors to turn the lawnmower.

The lawnmower can include a motion tracking element such as an inertial measurement unit (IMU) that detects and/or records information associated with motion of the lawnmower. By way of example, the IMU can detect various forces exerted on the lawnmower, including, e.g., direction of movement, moving forces, moving magnetic orientation, acceleration, and gyroscopic movement.

In general, lawnmowers, lawn maintenance tools, systems, and methods described herein can provide assisted steering control for a smooth driver experience while also allowing for precise manual steering control, particularly for quick and tight turns. In an embodiment, a lawnmower can include a control system having a processor and a memory storing instructions which, when executed by the processor, causes the lawnmower to implement assisted steering control in which a rate of active steering adjustment (i.e., an amount of adjustment actively implemented by the control system to affect steering output of the lawnmower) is affected. The rate of active steering adjustment may vary based on one or more parameters, such as an amount of steering input received from a user at a user input of the lawnmower, a speed of the lawnmower over the underlying ground surface, a motor speed (e.g., as measured in revolutions per minute (RPM)), etc.

In some implementations, the amount of active steering adjustment implemented by the control system may be relatively high when the lawnmower (and more particularly, the control system of the lawnmower) is expecting to travel straight, e.g., in response to receiving a user input that only minimally adjusts a direction of the lawnmower relative to a straight trajectory, but directional information, e.g., received from the IMU, indicates that the lawnmower is traveling in a non-straight trajectory. Conversely, the amount of active steering adjustment implemented by the control system may be relatively low when the lawnmower is expecting to turn, e.g., in response to receiving a user input indicative of a quick or tight turn. In such a manner, the control system can decrease jerking and wavering of the lawnmower when the control system of the lawnmower expects to travel in a straight, or relatively straight, trajectory while also allowing the lawnmower to quickly and precisely response to user inputs indicative of relatively tight turns.

The control system can include a lookup table or other instructions which include information associated with one or more gain profiles. Each gain profile can correspond to a different handling feel of the lawnmower. For example, implementing a first example gain profile can result in relatively unaffected steering control (i.e., steering control similar to a one-to-one steering control profile where the lawnmower moves in a one-to-one ratio relative to the user input) while implementing a second example gain profile can result in a relatively high amount of corrective steering control. Implementing the second example gain profile can thus result in the control system of the lawnmower providing a greater degree of corrective action.

In some implementations, the lawnmower may only operate using a single gain profile. In other implementations, the lawnmower may have a selector which allows a user (e.g., a rider) to switch between a plurality of different gain profiles. In some instances, the lawnmower can remain in the selected operating state (i.e., maintain the selected gain profile) until the user switches to a different one of the plurality of gain profiles. In other instances, the lawnmower can default to a preferred operating state (i.e., a particular gain profile) upon occurrence of a triggering event. By way of example, the triggering event can include starting the lawnmower from an OFF state or turning the lawnmower to the OFF state. Upon occurrence of the triggering event, the lawnmower can assume the preferred operating state. In some instances, the user can adjust the operating state (i.e., the selected gain profile) while the lawnmower is in use (e.g., while the lawnmower is actively moving). In other instances, the operating state of the lawnmower may be adjusted by the user only when the lawnmower is in a certain state, such as when the lawnmower is not actively moving.

As the lawnmower traverses over a ground surface, several forces may simultaneously act on the lawnmower, all of which tend to result in the lawnmower deviating from a desired path, as expected in view of feedback received from the user inputs. For example, when traversing a slope (such as a hill) in a direction perpendicular to the slope, gravitational force tends to cause the lawnmower to turn downhill. As a result, the operator often has to turn the lawnmower uphill to maintain a straight line across the slope. Similarly, when traversing rugged or bumpy terrain, the wheels of the lawnmower may become affected (e.g., turned) by the ground surface, causing the lawnmower to turn. For example, if the lawnmower traverses a depression in the ground surface such that one or more wheels are effectively traversing a slope of the depression in a direction perpendicular to the slope, the lawnmower may have a tendency to turn in a direction relative to an intended direction of travel. Conversely, if the lawnmower traverses a ridge in the ground surface at an angle between 15° and 75°, the lawnmower may have a tendency to turn in a direction relative to an intended direction of travel. The forces described above are merely exemplary of the types of forces acting on the lawnmower. In some instances, the lawnmower may simultaneously encounter a plurality of different forces which tend to result in the mower deviating from the desired path.

The control system can at least partially counteract the effect of the force(s) by applying corrective steering to the lawnmower to offset the effects of the force(s) on the lawnmower's direction of travel. As described above, the relative amount (degree) of counteraction applied by the control system to adjust the trajectory of the lawnmower may vary depending on one or more parameters, such as the amount of steering input received from a user at a user input. Where the amount of steering input received at the user input is nominal (e.g., less than 2% of a possible (maximum) user input), the control system may apply a maximum amount of counteraction to offset the effect of the force(s). Where the amount of input received at the user input is relatively large (e.g., greater than 10% of the possible (maximum) user input), the control system may apply a reduced amount of counteraction to offset the effect of the force(s). In this regard, the lawnmower may track in a straight, or substantially straight, line despite force(s) acting on the lawnmower while also allowing the user to quickly adjust an orientation of the lawnmower by providing steering inputs at the user input without incurring counteractive forces that tend to prevent the adjustment.

Referring now to the drawings, FIG. 1 illustrates a lawnmower 100 in accordance with an exemplary embodiment. The depicted lawnmower 100 is a riding lawnmower, however in other instances the lawnmower 100 can be a push lawnmower, an autonomous lawnmower, or another type of powered lawn maintenance tool, such as a tractor, a powered wheelbarrow, a skid steer, or the like. The lawnmower 100 generally includes a frame 102 and a walking element for transporting the frame 102 over an underlying ground surface. In an embodiment, the walking element includes a plurality of wheels 104 supporting the frame 102. The wheels 104 can include at least one powered (driven) wheel 104A. The wheels 104 can include at least one passive wheel 104B, such as a caster wheel. In an embodiment, the at least one powered wheel 104A includes a plurality of powered wheels 104A, such as a left powered wheel and a right powered wheel. The powered wheel(s) 104A are each driven by a motor (not illustrated). In some implementations, the motor can directly drive the powered wheel 104A. In other implementations, a gearbox or other intermediary torque transfer element can be disposed between the motor and the powered wheel 104A. Steering of the lawnmower 100 may be performed by adjusting the motor speed associated with each of the powered wheels 104A. For example, the lawnmower 100 may turn left in response to a right powered wheel 104A being driven faster than a left powered wheel 104A. Conversely, the lawnmower 100 may turn right in response to a left powered wheel 104A being driven faster than a right powered wheel 104A. In some instances, the passive wheel(s) 104B lack independent steering control and spin freely about a rotational axis 106. In other instances, the passive wheel(s) 104B can be steered, e.g., by a motor that drives the passive wheel(s) 104B about the rotational axis 106.

The lawnmower 100 can further include a cutting deck 108 supported by the frame 102. The cutting deck 108 can house one or more cutting implements (not illustrated), such as blade(s), that are rotatably driven by a motor (not illustrated). The cutting deck 108 can include a discharge chute 110 for directing debris from the cutting deck 108 during operation of the cutting implements. The cutting deck 108 can be coupled to the frame 102 through a suspension 112 that allows the cutting deck 108 to move relative to the frame 102.

A seat 114 is coupled to the frame 102 and provides an area for a user to reside while operating the lawnmower 100. The seat 114 is in the vicinity of one or more user inputs that allow the user to control operation of the lawnmower 100. The depicted user inputs include a left lap bar 116 and a right lap bar 118. The left and right lap bars 116 and 118 are each rotatable about a pivot axis to allow the user to input steering commands to the lawnmower 100. The user can push and pull on the left and right lap bars 116 and 118, causing the lap bars 116 and 118 to displace about the pivot axis. The further forward the left and right lap bars 116 and 118 are pushed, the faster the lawnmower 100 travels. By pushing the right lap bar 118 further forward than the left lap bar 116, i.e., generating relative displacement between the left and right lap bars 116 and 118, a control system of the lawnmower 100 can determine that the user wants the lawnmower 100 to turn one direction (e.g., left). By pushing the left lap bar 116 further than the right lap bar 118, the control system can determine that the user wants the lawnmower 100 to turn in the opposite direction (e.g., right). The relative difference in displacement between the left and right lap bars 116 and 118 can provide input as to how quickly the user wants the lawnmower 100 to turn. When the user wants to turn quickly, the relative displacement between the left and right lap bars 116 and 118 is relatively large (i.e., one of the lap bars 116 or 118 is displaced significantly further than the other lap bar 116 or 118). When the user wants to turn relatively slowly, the relative displacement between the left and right lap bars 116 and 118 is small. In other embodiments, the user input(s) can include an accelerator, a steering wheel, a joystick, another steering implement, or any combination thereof.

Figure 2:
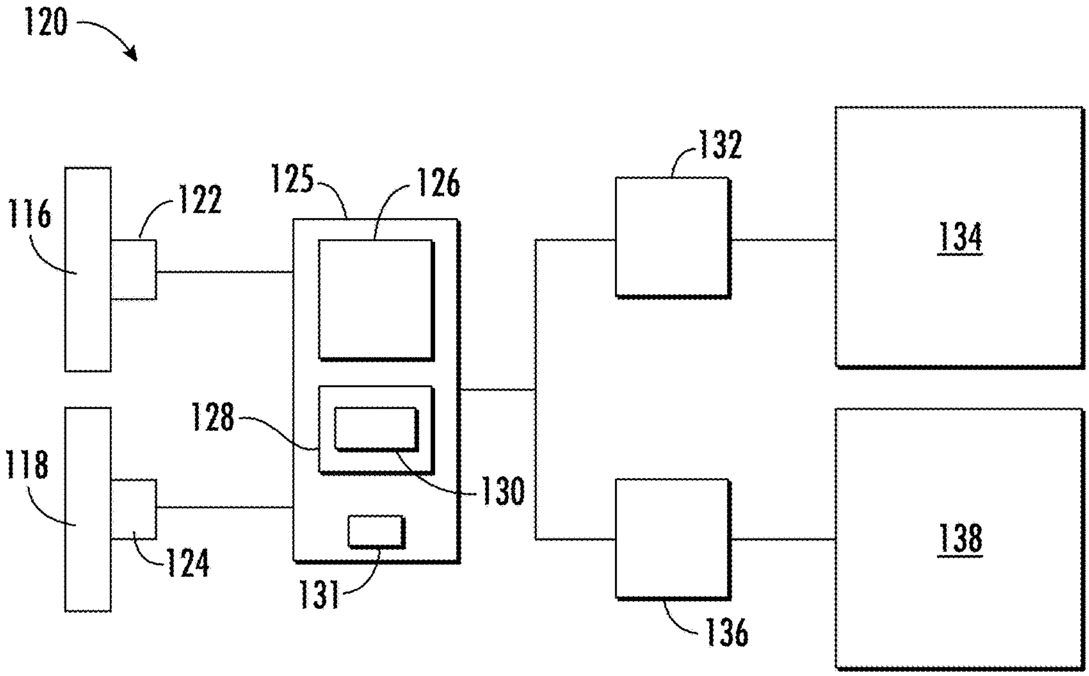
FIG. 2 is a schematic view of a control system of the lawnmower in accordance with embodiments of the present disclosure.

FIG. 2 illustrates a schematic view of a control system 120 for controlling travel of the lawnmower 100 based on inputs received at the left and right lap bars 116 and 118. While the following description is made with respect to the left and right lap bars 116 and 118, it should be understood that the systems, techniques, and methods described herein may be implemented with other types of user inputs, including for example, joysticks, steering wheels, and the like.

The control system 120 generally includes a first sensor 122 that detects a position of the left lap bar 116 and a second sensor 124 that detects a position of the right lap bar 118. By way of non-limiting example, the first and second sensors 122 and 124 can each include a rotational encoder (e.g., an absolute encoder or a relative encoder) that senses relative displacement of the left or right lap bar 116 or 118. The first and second sensors 122 and 124 can each generate a signal indicative of the relative position of the left and right lap bars 116 and 118, respectively, and transmit the signal to a controller 125. In embodiments including a single user input (or, more particularly, a single steering input, such as a steering wheel), the first and second sensors 122 and 124 can be replaced by a single sensor that detects the position of the single user input.

The controller 125 can include one or more processors 126. The processor(s) 126 can be any suitable processing device (e.g., a control circuitry, a processor core, a microprocessor, an application specific integrated circuit, a field programmable gate array, a controller, a microcontroller, etc.) and can be one processor or a plurality of processors that are operatively connected. The processor(s) 126 can be coupled to memory 128. The memory 128 can include one or more non-transitory computer-readable storage media, such as RAM, ROM, EEPROM, EPROM, one or more memory devices, flash memory devices, etc., and combinations thereof. The memory 128 can store information that can be accessed by the processor(s) 126. For instance, the memory 128 (e.g., one or more non-transitory computer-readable storage mediums, memory devices) can include computer-readable instructions 130 that can be executed by the processor(s) 126. The instructions 130 can be software, firmware, or both written in any suitable programming language or can be implemented in firmware or hardware. Additionally, or alternatively, the instructions 130 can be executed in logically and/or virtually separate threads on processor(s) 126. For example, the memory 128 can store instructions 130 that when executed by the processor(s) 126 cause the processor(s) 126 to perform operations such as any of the operations and functions as described herein.

The controller 125 can communicate with one or more motor controllers, such as a first motor controller 132 in communication with a first motor 134 and a second motor controller 136 in communication with a second motor 138. The first motor 134 may be associated with a first powered wheel 104A of the lawnmower 100 and the second motor 138 may be associated with a second powered wheel 104A of the lawnmower 100. The first and second motors 134 and 138 can receive power form a power source of the lawnmower 100, such as an onboard battery (e.g., a rechargeable battery). The motor controllers 132 and 136 can modulate a signal, such as current or voltage, supplied to the motors 134 and 138, e.g., using proportional-integral-derivative (PID) control logic, in response to information received at the controller 125 from the first and second sensors 122 and 124. By modulating the signal to the motors 134 and 138, the motor controllers 132 and 136 can control a direction of the lawnmower 100 and how quickly the lawnmower 100 turns. It should be understood that other arrangements and configurations for the control system 120 are possible without deviating from the scope of the disclosure. For example, in some implementations, the one or both of the motor controllers 132 or 136 can be integrated into the controller 125. In other implementations, the controller 125 can include separate controllers each associated with a different one of the motor controllers 132 and 136. In some instances, the motor controllers 132 and 136 can have a hierarchical arrangement relative to each other such that, e.g., the first motor controller 132 is disposed upstream of the second motor controller 136 and provides instructions to the second motor controller 136.

In an embodiment, the control system 120 further includes a motion tracking element such as an inertial measurement unit (IMU) 131. The IMU 131 can detect and/or record various forces exerted on the lawnmower 100, including, e.g., direction of movement, moving forces, moving magnetic orientation, acceleration, and gyroscopic movement. In an embodiment, the IMU 131 can include a gyroscope arrangement that detects gyroscopic movement of the lawnmower 100 in three axis (e.g., X-, Y-, and Z-axis). The IMU 131 can include an accelerometer that detects rate of acceleration or deceleration in the three axis (e.g., the X-, Y-, and Z-axis). In some implementations, the IMU 131 can be part of the controller 125. For example, the IMU 131 can be integrated with a printed circuit board (PCB) of the controller 125. In some instances, the IMU 131 can include more than one IMU to improve accuracy and eliminate error over time.

The IMU 131 can be communicatively coupled to the controller 125. The controller 125 can receive data from the IMU 131 and process the data when generating commands for operating the lawnmower 100. In an embodiment, the controller 125 can implement modifications to commands for operating the lawnmower 100 in response to the processed data from the IMU 131.

In some instances, the IMU 131 may undergo calibration prior to use. By way of non-limiting example, calibration can be performed by moving the IMU 131 in a preset motion pattern, such as a "FIG. 8" pattern. The IMU 131 can detect and record acceleration and gyroscopic motion when exposed to this motion pattern to complete calibration. By way of another example, the IMU 131 may calibrate during startup of the lawnmower 100 as it is generally assumed the lawnmower is stationary and on relatively level ground surface during startup. In some instances, calibration can occur once, e.g., when the lawnmower 100 is first used. In other instances, calibration can occur repeatedly, such as during successive startup procedures. For example, the IMU 131 can automatically initiate calibration upon receiving power when the lawnmower 100 is started.

The control system 120 can control movement of the lawnmower 100 over the underlying ground surface in response to user input, e.g., received at the left and right lap bars 116 and 118. For example, information associated with the positions of the left and right lap bars 116 and 118 detected by the first and second sensors 122 and 124 can be communicated to the controller 125 which can generate command instructions for the motor controllers 132 and 136 to operate the motors 134 and 138 accordingly. The motors 134 and 138 can drive the powered wheels 104A to affect a desired movement pattern (e.g., a turn).

In some implementations, the control system 120 can be adjustable between different control schemes. For example, the lawnmower 100 can include a selector (e.g., a digital selector, a mechanical selector, an electrical selector, or any combination thereof) that permits the user to switch between the different controls schemes. In an embodiment, each control scheme can operate by employing a different gain protocol. As described below, different gain protocols can result in different performance characteristics of the lawnmower 100, as experienced by the user (e.g., rider). For instance, a first gain protocol can result in one-to-one steering control of the lawnmower 100 while a second gain protocol can result in variable steering control of the lawnmower 100.

In an embodiment, the control system 120 can affect steering of the lawnmower 100 using a one-to-one (1:1) steering control profile. When operating with one-to-one steering control profile, movement of the lawnmower 100, and more particularly turning performance of the lawnmower 100, is directly proportional to input(s) received at the user inputs, e.g., the left and right lap bars 116 and 118. For example, when implementing one-to-one steering control, a 50% displacement of the left lap bar 116 results in approximately half the effect as compared to a 100% displacement of the left lap bar 116. Similarly, a 10% displacement of the right lap bar 118 results in approximately one Tenth ($1/10^{th}$) the effect as compared to a 100% displacement of the right lap bar 118. Thus, turning performance is scaled on a one-to-one basis.

In other embodiments, the control system 120 can control the lawnmower 100 to operate using a variable steering control profile. Variable steering control can refer to a condition whereby the control system 120 implements control logic to variably control movement of the lawnmower 100 other than on a one-to-one basis in response to input(s) received at the user inputs, e.g., the left and right lap bars 116 and 118. To affect variable steering control, the control system 120 can implement a gain profile to adjust the control instructions provided from the controller 125 to the motor controllers 132 and 136 based on the detected information received at the first and second sensors 122 and 124.

The relative amount of gain implemented by the control system 120 at any given time can be determined in response to the input received at the user input(s) (e.g., the first and second lap bars 116 and 118) and a corresponding scale factor α provided by the gain profile based on the received input. Tables 1 and 2 provide example gain profiles that are depicted graphically in FIGS. 3 and 4, respectively.

TABLE 1

| First Gain Profile | |
|---|---|
| Amount of Input Turn (%) | Scale Factor (α) |
| 1 | 2 |
| 2 | 2 |
| 13.5 | 1.25 |
| 25 | 0.5 |
| 50 | 0.5 |

TABLE 2

| Second Gain Profile | |
|---|---|
| Amount of Input Turn (%) | Scale Factor (α) |
| 1 | 2 |
| 2 | 2 |
| 13.5 | 0.8 |
| 25 | 0.5 |
| 50 | 0.5 |

The gain profiles in Tables 1 and 2 provide example scale factors α used to adjust steering of the lawnmower 100 in accordance with an example embodiment based on the amount of turning input received at the user input, e.g., the left and right lap bars 116 and 118. The amount of input shown in Tables 1 and 2 is measured as a percentage of maximum possible turning capability of the lawnmower 100. For example, if the lawnmower 100 is capable of turning at a maximum rate of 90° per second, a 50% input results in the lawnmower 100 turning at a rate of 450 per second. Similarly, if the lawnmower 100 is capable of executing a 180° turn in 2 seconds, a 50% input results in the lawnmower 100 turning 180° in 4 seconds. It should be understood that in some implementations the maximum rate of turn or turning capability of the lawnmower may be determined at least in part by a relative speed of the lawnmower. For example, the lawnmower may be able to turn at a first turn rate (i.e., a first angular velocity) when the lawnmower is traveling at a first speed and a second rate (i.e., a second angular velocity) when the lawnmower is traveling at a second speed, where the first and second turning rates are different from each other. The scale factors α may be implemented in view of the turn rate at the speed of travel. Thus, a certain turning input may be affected differently when the lawnmower is travelling at the first speed as compared to when the lawnmower is travelling at the second speed.

Figure 3:
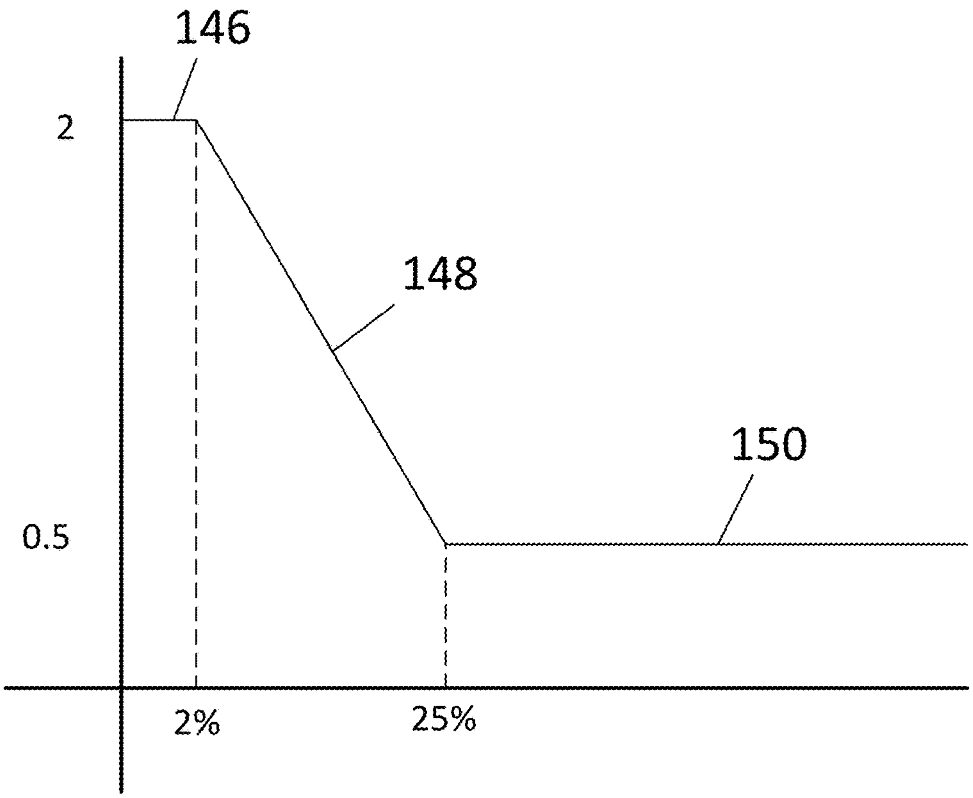
FIG. 3 is a graph including a gain profile for use by the control system of the lawnmower in accordance with embodiments of the present disclosure.

FIG. 3 illustrates a graph of a first gain profile shown in Table 1 where the Y-axis corresponds with a value for scale factor α and the X-axis corresponds with an amount of turning input received at the user inputs (turn input) as a percentage of total turning capability of the lawnmower 100. It should be understood that the amount of turn input shown on the X-axis is an absolute value and applies to turns in both the left and right directions. With reference to Table 1 and FIG. 3, the first gain profile maintains a constant scale factor α of 2 when the turn input is between a straight heading (i.e., 0% turn) and a 2% turn input. Between a 2% turn input and a 25% turn input the scale factor α drops linearly from 2 to 0.5. Any turn input exceeding 25% (e.g., 30%, 40%, 50%, etc.) results in a scale factor α of 0.5.

Figure 4:
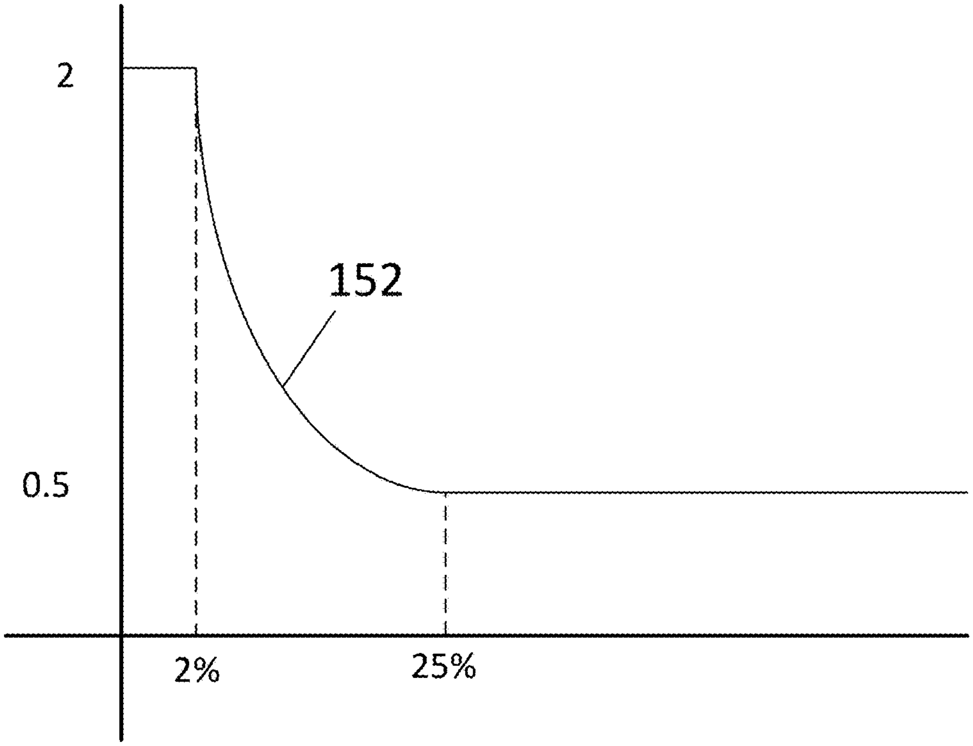
FIG. 4 is a graph including a gain profile for use by the control system of the lawnmower in accordance with embodiments of the present disclosure.

FIG. 4 illustrates a graph of the second gain profile shown in Table 2 where the Y-axis corresponds with scale factor α and the X-axis is turn input a percentage of total turning capability of the lawnmower 100. It should be understood that the amount of turn input shown on the X-axis is an absolute value and applies to turns in both the left and right directions. With reference to Table 2 and FIG. 4, the second variable gain protocol maintains a constant scale factor α of 2 when the turn input is between a straight heading (i.e., 0% turn) and a 2% turn input. Between a 2% turn input and a 25% turn input the scale factor α drops exponentially from 2 to 0.5. Any turn input exceeding 25% (e.g., 30%, 40%, 50%, etc.) results in a scale factor α of 0.5.

Figure 5:
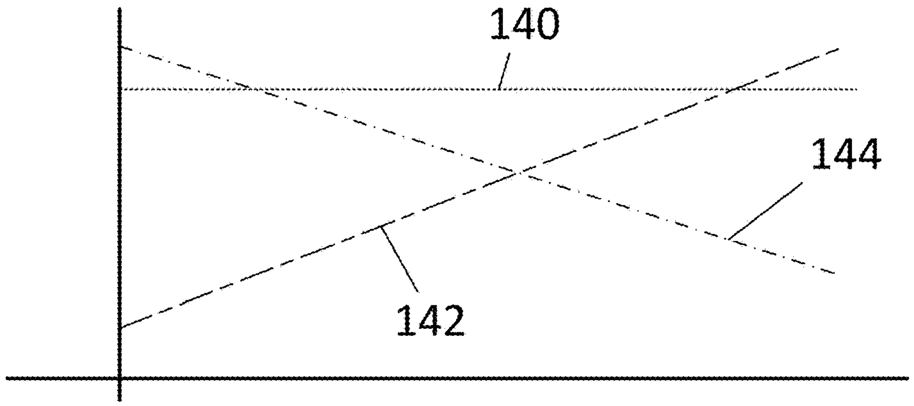
FIG. 5 is a graph including a plurality of gain profiles for use by the control system of the lawnmower in accordance with embodiments of the present disclosure.

Yet other types of gain profiles are possible. For example, as shown in FIG. 5 the gain profile can include a fixed sale factor α, as shown by line 140, where the scale factor α remains constant over the entire range of turn input; an increasing gain, as shown by line 142, where the scale factor α increases as the turn input is increased; and a decreasing gain, as shown by line 144, where the scale factor α decreases as the turn input is decreased. In some instances, the gain profile can include a single linear slope such as illustrated by each of lines 140, 142 and 144. In other instances, the gain profile can include linear segments (segmentations) such as illustrated by the gain profile depicted in FIG. 3 with a first segment 146 occurring between 0% and 2% turn input, a second segment 148 occurring between 2% and 25% turn input, and a third segment 150 occurring over 25% turn input. In yet other instances, the gain profile can include arcuate (curved) segments such as illustrated by the gain profile in FIG. 4 with a segment 152 having an arcuate curve extending between 2% and 25% turn input. It is noted that while the graphs depicted in FIGS. 3, 4, and 5 use turn input along the X-axis, in other instances, the X-axis can correspond with a speed of the lawnmower as measured over the underlying ground surface, a motor speed (e.g., as measured in revolutions per minute (RPM)), or any other suitable parameter.

The scale factor α is used by the controller 125 to adjust the actual turning performance of the lawnmower 100 as compared to an expected one-to-one turning characteristic. Equation (1) shows one example methodology for implementing scale factor α from a stored gain profile to adjust steering:

$$\omega_{corrected} = \omega_{expected} + (\alpha)(\omega_{expected} - \omega_{measured}) \qquad (1)$$

where $\omega_{expected}$ is a measure of angular velocity of the lawnmower 100 that is expected to be detected by the IMU 131 in view of user inputs, e.g., at the left and right lap bars 116 and 118, $\omega_{measure}$d is the actual measured angular velocity of the lawnmower 100 as detected by the IMU 131, a is the scale factor, and $\omega_{corrected}$ is a corrected angular velocity that, when implemented, accounts for inconsistencies between the measured and expected angular velocities of the lawnmower 100 in view of the scale factor α.

Expected angular velocity ($\omega_{expected}$) may be determined in view of feedback provided at the user inputs. For example, where the left and right lap bars 116 and 118 are equally positioned relative to one another (i.e., there is no relatively displacement between the left and right lap bars 116 and 118), the controller 125 can determine that an expected angular velocity of the lawnmower 100 relative to a current heading should be equal to 0.0 radians/second (rad/s) (i.e., the lawnmower 100 is not turning). In instances where the IMU 131 measures an actual measured velocity that differs from the expected angular velocity of 0.0 rad/s (indicative of the lawnmower undergoing angular displacement relative to a current heading), the controller 125 can adjust control signals provided to the first and second motor controllers 132 and 136 in view of Equation (1) and the active gain profile. Use of the active gain profile can require querying a lookup table or other instructions which include information associated with one or more gain profiles to determine the appropriate scale factor α. Since the expected angular velocity of the lawnmower is nominal (0.0 rad/s), the scale factor may be relatively large. The adjusted control signals can cause the first and second motor controllers 132 and 136 to control the motors 134 and 138 such that the lawnmower 100 maintains the current heading with an actual measured angular velocity of 0.0 rad/s. Effectively, the adjusted signal may cause the lawnmower 100 to turn in a manner to correct for the unexpected deviation detected by the IMU 131.

By way of another example, where the left and right lap bars 116 and 118 are displaced relative to one another such that the turn input is 50% of the turning capability of the lawnmower 100, the controller 125 can determine an expected angular velocity of the lawnmower 100, such as for example, 0.75 rad/s. In instances where the IMU 131 measures an actual measured velocity that different from the expected angular velocity of 0.75 rad/s (indicative of the lawnmower undergoing angular displacement different than desired), the controller 125 can adjust control signals provided to the first and second motor controllers 132 and 136 in view of Equation (1) and the active gain profile. Use of the active gain profile can require querying a lookup table or other instructions which include information associated with one or more gain profiles to determine the appropriate scale factor α. Since the expected angular velocity of the lawnmower is large (0.75 rad/s), the scale factor may be relatively small. Unlike with the first example where the expected angular velocity is 0.0 rad/s, here, where the expected angular velocity is 0.75 rad/s and the scale factor α is relatively small, the adjusted signal may not cause the lawnmower 100 to significantly correct for the unexpected deviation detected by the IMU 131.

Figure 6:
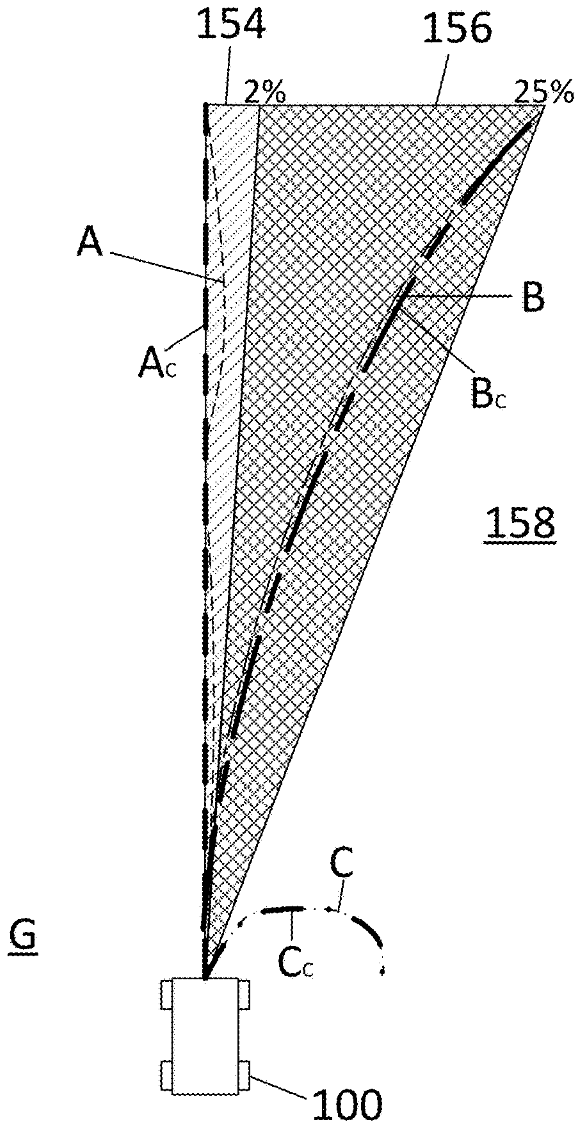
FIG. 6 is a schematic view of a gain profile overlaid on a ground surface with a lawnmower and various paths and corrected paths in view of an implemented gain profile in accordance with embodiments of the present disclosure.

By applying scale factor α to steering control, the control system 120 can provide several improved behavioral characteristics that increase operational precision of the lawnmower 100. Referring to FIG. 6, the lawnmower 100 is depicted on an underlying ground surface G with an example gain profile overlaid on the ground surface G to demarcate relative scale factors based on the current position of the lawnmower 100 and potential turning parameters that may be received at the user input, e.g., the left and right lap bars 116 and 118. The depicted gain profile is taken from FIG. 3 and Table 1. When the lawnmower 100 receives a user input indicative of a turn input between 0% and 2% (i.e., a turn within a first range 154), the lawnmower 100 applies a first scale factor α corresponding to the scale factor depicted in FIG. 3 by segment 146 and described in Table 1 as a scale factor equal to 2.0. When the lawnmower 100 receives a turn input between 2% and 25% (i.e., a turn within a second range 156), the lawnmower 100 applies a second scale factor α different than the first scale factor α. In an embodiment, the second scale factor α can correspond to the scale factor depicted in FIG. 3 by segment 148 and described in Table 1 as a scale factor between 0.5 and 2.0. When the lawnmower 100 receives a turn input exceeding 25% (i.e., a turn within a third range 158), the lawnmower 100 applies a third scale factor α different than the first and second scale factors α. In an embodiment, the third scale factor α can correspond to the scale factor α depicted in FIG. 3 by segment 150 and described in Table 1 as a scale factor equal a to 0.5. Since scale factor α corresponds to an amount of steering control implemented by the control system 120 (with larger scale factors α resulting in greater control of the turn by the steering assist system), it should be understood that when a user provides a turn input with a high scale factor α, like when the user maintains the lawnmower 100 within the first range 154, the corrective input is higher than when the user provides a turn input where the lawnmower 100 is turned within the second or third ranges 156 or 158. In this regard, the lawnmower 100 can provide higher steering correction factor when the turn input is relatively minimal and provide lower steering correction factor when the turn input is relatively significant. Thus, the lawnmower 100 can maintain its heading in a straight line despite bumps and undulating terrain, sloped ground surfaces, and minor accidental steering control inputs. However, as the control system 120 recognizes the user's desire to change the direction of travel, the degree of corrective control exercised by the control system 120 is reduced, allowing the user to change direction without having to overcome significant resistance as created by the assisted steering system.

FIG. 6 illustrates three exemplary paths A, B, and C that the lawnmower 100 might follow in a one-to-one steering control implementation in response to three different turn inputs received at the user input. Exemplary path A is within the first range 154, exemplary path B is within the second range 156, and exemplary path C is within the third range 158. Corrected paths $A_C$, $B_C$, and $C_C$ are also depicted to show a corrected path to be taken by the lawnmower 100 in response to implementation of the assisted steering control functionality described herein. As depicted, the difference between A and $A_C$ is larger than the difference between B and $B_C$, which is larger than the difference between C and $C_C$. This difference occurs as a result of the control system 120 providing the greatest corrective control within the first range 154 with reduced corrective control in the second range 156, and yet further reduced corrective control in the third range 158. Accordingly, the lawnmower 100 may provide corrective steering override as a function of the turn input received from the user at the left and right lap bars 116 and 118.

While FIG. 6 illustrates three distinct ranges 154, 156, and 158 with discrete crossover conditions where each range transitions to the next range, it should be understood that in other implementations the ranges 154, 156, and 158 may merge together by way of a more gradual transition. For example, the gain profile depicted by line 144 in FIG. 5 results in the formation of a single range having a linearly (constantly) decreasing scale factor α in view of the amount of turning input received at the left and right lap bars 116 and 118. This is substantially similar to the range depicted by segment 148 in FIG. 3, however, unlike segment 148 in FIG. 3 (which is bounded by segments 146 and 150 having different scale factors), the gain profile depicted by line 144 extends from 0% turn input continuously towards 100% turn input. In some instances, the gain profile including the linearly (constantly) decreasing scale factor α can terminate with a segment having a constant scale factor α for a final range of the turning input. For example, it may be undesirable for turns approaching 100% to have a 0 (zero) scale factor α correction. Thus, even the gain profile depicted by line 144 may terminate in a scale factor α, e.g., 0.15.

Further aspects of the invention are provided by one or more of the following embodiments:

Embodiment 1. A lawnmower comprising: a wheel; a motor operably coupled to drive the wheel; a user input configured to receive a steering control input from a user; and a controller configured to operate in a steering assist mode where the controller: receives information from the user input, the information including a position of the user input; compares the position of the user input to a gain profile saved in a memory of the controller; determines a scale factor from the gain profile based on the comparison; generates a command instruction to control a speed of the motor based on the position of the user input and the determined scale factor; and transmits the command instruction to the motor to affect a speed of the motor, wherein the gain profile has a first scale factor associated with a first position of the user input and a second scale factor associated with a second position of the user input, and wherein the first scale factor is different than the second scale factor.

Embodiment 2. The lawnmower of any one or more of the embodiments, wherein the first position of the user input corresponds to a first turn input, wherein the second position of the user input corresponds to a second turn input, wherein the second turn input is greater than the first turn input, and wherein the scale factor at the second position of the user input is less than the scale factor at the first position of the user input.

Embodiment 3. The lawnmower of any one or more of the embodiments, wherein the gain profile includes a plurality of scale factors each associated with a different position of the user input.

Embodiment 4. The lawnmower of any one or more of the embodiments, wherein generating the command instruction to control the speed of the motor comprises: determining an expected angular velocity of the lawnmower based on the position of the user input; measuring an actual angular velocity of the lawnmower; calculating a deviation between the expected angular velocity and the actual angular velocity; applying the determined scale factor to the calculated deviation; and determining the command instruction based on the calculated deviation in view of the applied determined scale factor.

Embodiment 5. The lawnmower of any one or more of the embodiments, wherein measuring the actual angular velocity of the lawnmower is performed by an inertial measurement unit (IMU) disposed on the lawnmower and coupled to the controller.

Embodiment 6. The lawnmower of any one or more of the embodiments, wherein the gain profile is selectable from a plurality of different gain profiles stored on a memory of the controller.

Embodiment 7. The lawnmower of any one or more of the embodiments, wherein the user input comprises a lap bar, a steering wheel, a joystick, an accelerator, or any combination thereof.

Embodiment 8. The lawnmower of any one or more of the embodiments, wherein the lawnmower further comprises a motor controller disposed in electrical communication between the controller and the motor, and wherein transmitting the command instruction to the motor comprises: transmitting, from the controller, the command instruction to the motor controller, and transmitting, from the motor controller, a command signal to the motor to affect the speed of the motor.

Embodiment 9. A steering assist system for a lawnmower, the steering assist system comprising: an inertial measurement unit (IMU); and a controller configured to operate in a steering assist mode where the controller: receives information from a user input, the information including a position of the user input; receives, from the IMU, a measured angular velocity of the lawnmower; calculates a deviation between the measured angular velocity and an expected angular velocity based on the position of the user input; compares the position of the user input to a gain profile saved in a memory of the controller; determines a scale factor from the gain profile based on the comparison; generates a command instruction to control a speed of a motor of the lawnmower based on the position of the user input, the determined scale factor, and the calculated deviation; and transmits the command instruction to the motor to affect a speed of the motor, wherein the gain profile has a first scale factor associated with a first position of the user input and a second scale factor associated with a second position of the user input, and wherein the first scale factor is different than the second scale factor.

Embodiment 10. The steering assist system of any one or more of the embodiments, wherein transmitting the command instruction to the motor comprises: transmitting, from the controller, the command instruction to a motor controller, and transmitting, from the motor controller, a command signal to the motor to affect the speed of the motor.

Embodiment 11. The steering assist system of any one or more of the embodiments, wherein the first position of the user input corresponds to a first turn input, wherein the second position of the user input corresponds to a second turn input, wherein the second turn input is greater than the first turn input, and wherein the scale factor at the second position of the user input is less than the scale factor at the first position of the user input.

Embodiment 12. The lawnmower of any one or more of the embodiments, wherein the gain profile includes a plurality of scale factors each associated with a different position of the user input.

Embodiment 13. The lawnmower of any one or more of the embodiments, wherein the gain profile is selectable from a plurality of different gain profiles stored on a memory of the controller.

Embodiment 14. The lawnmower of any one or more of the embodiments, wherein the user input comprises a left lap bar and a right lap bar, wherein a position of the left lap bar is detected by a first sensor, wherein a position of the right lap bar is detected by a second sensor, and wherein the first and second sensors are in communication with the controller.

Embodiment 15. A non-transitory computer-readable medium storing instructions which, when executed, cause performance of a method of adjusting a direction of travel of a lawnmower using a steering assist system, the method comprising: determining, by a controller of the lawnmower, an expected angular velocity of the lawnmower based on a position of a user input, the user input configured to receive a turn input from a user; measuring, by an inertial measurement unit (IMU) of the lawnmower, an actual angular velocity of the lawnmower; calculating, by the controller, an deviation between the expected angular velocity and the actual angular velocity; comparing, by the controller, the position of the user input to a gain profile saved in a memory of the controller; determining, by the controller, a scale factor from the gain profile based on the comparison, wherein the gain profile has a first scale factor associated with a first position of the user input and a second scale factor associated with a second position of the user input, and wherein the first scale factor is different than the second scale factor; applying, by the controller, the determined scale factor to the calculated deviation; determining, by the controller, a command instruction based on the calculated deviation in view of the applied determined scale factor; and transmitting the command instruction to a motor of the lawnmower to affect a speed of the motor.

Embodiment 16. The non-transitory computer-readable medium of any one or more of the embodiments, wherein transmitting the command instruction to the motor comprises: transmitting, from the controller, the command instruction to a motor controller, and transmitting, from the motor controller, a command signal to the motor to affect the speed of the motor.

Embodiment 17. The non-transitory computer-readable medium of any one or more of the embodiments, wherein the first position of the user input corresponds to a first turn input, wherein the second position of the user input corresponds to a second turn input, wherein the second turn input is greater than the first turn input, and wherein the scale factor at the second position of the user input is less than the scale factor at the first position of the user input.

Embodiment 18. The non-transitory computer-readable medium of c any one or more of the embodiments, wherein the gain profile includes a plurality of scale factors each associated with a different position of the user input.

Embodiment 19. The non-transitory computer-readable medium of any one or more of the embodiments, further comprising selecting, by the user, the gain profile from a plurality of gain profiles saved on the memory.

Embodiment 20. The non-transitory computer-readable medium of any one or more of the embodiments, further comprising activating, by the user, the steering assist system.

The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lawnmower comprising:

a wheel;

a motor operably coupled to drive the wheel;

a user input configured to receive a steering control input from a user; and a controller configured to operate in a steering assist mode where the controller:

receives information from the user input, the information including a position of the user input;

compares the position of the user input to a gain profile saved in a memory of the controller;

determines a scale factor from the gain profile based on the comparison;

generates a command instruction to control a speed of the motor based on the position of the user input and the determined scale factor; and transmits the command instruction to the motor to affect a speed of the motor, wherein the gain profile has a first scale factor associated with a first position of the user input and a second scale factor associated with a second position of the user input, and wherein the first scale factor is different than the second scale factor.

2. The lawnmower of claim 1, wherein the first position of the user input corresponds to a first turn input, wherein the second position of the user input corresponds to a second turn input, wherein the second turn input is greater than the first turn input, and wherein the scale factor at the second position of the user input is less than the scale factor at the first position of the user input.

3. The lawnmower of claim 1, wherein the gain profile includes a plurality of scale factors each associated with a different position of the user input.

4. The lawnmower of claim 1, wherein generating the command instruction to control the speed of the motor comprises:

determining an expected angular velocity of the lawnmower based on the position of the user input;

measuring an actual angular velocity of the lawnmower;

calculating a deviation between the expected angular velocity and the actual angular velocity;

applying the determined scale factor to the calculated deviation; and determining the command instruction based on the calculated deviation in view of the applied determined scale factor.

5. The lawnmower of claim 4, wherein measuring the actual angular velocity of the lawnmower is performed by an inertial measurement unit (IMU) disposed on the lawnmower and coupled to the controller.

6. The lawnmower of claim 1, wherein the gain profile is selectable from a plurality of different gain profiles stored on a memory of the controller.

7. The lawnmower of claim 1, wherein the user input comprises a lap bar, a steering wheel, a joystick, an accelerator, or any combination thereof.

8. The lawnmower of claim 1, wherein the lawnmower further comprises a motor controller disposed in electrical communication between the controller and the motor, and wherein transmitting the command instruction to the motor comprises:

transmitting, from the controller, the command instruction to the motor controller, and transmitting, from the motor controller, a command signal to the motor to affect the speed of the motor.

9. A steering assist system for a lawnmower, the steering assist system comprising:

an inertial measurement unit (IMU); and a controller configured to operate in a steering assist mode where the controller:

receives information from a user input, the information including a position of the user input;

receives, from the IMU, a measured angular velocity of the lawnmower;

calculates a deviation between the measured angular velocity and an expected angular velocity based on the position of the user input;

compares the position of the user input to a gain profile saved in a memory of the controller;

determines a scale factor from the gain profile based on the comparison;

generates a command instruction to control a speed of a motor of the lawnmower based on the position of the user input, the determined scale factor, and the calculated deviation; and transmits the command instruction to the motor to affect a speed of the motor, wherein the gain profile has a first scale factor associated with a first position of the user input and a second scale factor associated with a second position of the user input, and wherein the first scale factor is different than the second scale factor.

10. The steering assist system of claim 9, wherein transmitting the command instruction to the motor comprises:

transmitting, from the controller, the command instruction to a motor controller, and transmitting, from the motor controller, a command signal to the motor to affect the speed of the motor.

11. The steering assist system of claim 9, wherein the first position of the user input corresponds to a first turn input, wherein the second position of the user input corresponds to a second turn input, wherein the second turn input is greater than the first turn input, and wherein the scale factor at the second position of the user input is less than the scale factor at the first position of the user input.

12. The lawnmower of claim 9, wherein the gain profile includes a plurality of scale factors each associated with a different position of the user input.

13. The lawnmower of claim 9, wherein the gain profile is selectable from a plurality of different gain profiles stored on a memory of the controller.

14. The lawnmower of claim 9, wherein the user input comprises a left lap bar and a right lap bar, wherein a position of the left lap bar is detected by a first sensor, wherein a position of the right lap bar is detected by a second sensor, and wherein the first and second sensors are in communication with the controller.

15. A non-transitory computer-readable medium storing instructions which, when executed, cause performance of a method of adjusting a direction of travel of a lawnmower using a steering assist system, the method comprising:

determining, by a controller of the lawnmower, an expected angular velocity of the lawnmower based on a position of a user input, the user input configured to receive a turn input from a user;

measuring, by an inertial measurement unit (IMU) of the lawnmower, an actual angular velocity of the lawnmower;

calculating, by the controller, a deviation between the expected angular velocity and the actual angular velocity;

comparing, by the controller, the position of the user input to a gain profile saved in a memory of the controller;

determining, by the controller, a scale factor from the gain profile based on the comparison, wherein the gain profile has a first scale factor associated with a first position of the user input and a second scale factor associated with a second position of the user input, and wherein the first scale factor is different than the second scale factor;

applying, by the controller, the determined scale factor to the calculated deviation;

determining, by the controller, a command instruction based on the calculated deviation in view of the applied determined scale factor; and transmitting the command instruction to a motor of the lawnmower to affect a speed of the motor.

16. The non-transitory computer-readable medium of claim 15, wherein transmitting the command instruction to the motor comprises:

transmitting, from the controller, the command instruction to a motor controller, and transmitting, from the motor controller, a command signal to the motor to affect the speed of the motor.

17. The non-transitory computer-readable medium of claim 15, wherein the first position of the user input corresponds to a first turn input, wherein the second position of the user input corresponds to a second turn input, wherein the second turn input is greater than the first turn input, and wherein the scale factor at the second position of the user input is less than the scale factor at the first position of the user input.

18. The non-transitory computer-readable medium of claim 15, wherein the gain profile includes a plurality of scale factors each associated with a different position of the user input.

19. The non-transitory computer-readable medium of claim 15, further comprising selecting, by the user, the gain profile from a plurality of gain profiles saved on the memory.

20. The non-transitory computer-readable medium of claim 15, further comprising activating, by the user, the steering assist system.

* * * * *